United States Patent
Pulskamp et al.

(10) Patent No.: US 8,790,616 B2
(45) Date of Patent: Jul. 29, 2014

(54) HYBRID HYDROGEN STORAGE SYSTEM AND METHOD USING THE SAME

(75) Inventors: Andrea Pulskamp, Plymouth, MI (US); Jun Yang, Ann Arbor, MI (US); Donald J. Siegel, Ann Arbor, MI (US); Michael Jon Veenstra, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 12/757,068

(22) Filed: Apr. 9, 2010

(65) Prior Publication Data
US 2011/0142750 A1    Jun. 16, 2011

(51) Int. Cl.
| | | |
|---|---|---|
| *C01B 3/04* | (2006.01) | |
| *B01J 7/00* | (2006.01) | |
| *B01J 20/22* | (2006.01) | |
| *B01J 20/28* | (2006.01) | |
| *B82Y 30/00* | (2011.01) | |
| *C01B 3/00* | (2006.01) | |
| *B01J 20/20* | (2006.01) | |
| *B01J 20/18* | (2006.01) | |

(52) U.S. Cl.
CPC ............... *B01J 20/20* (2013.01); *Y02E 60/327* (2013.01); *B01J 20/226* (2013.01); *B01J 20/28007* (2013.01); *B01J 2220/42* (2013.01); *B82Y 30/00* (2013.01); *C01B 3/001* (2013.01); *C01B 3/0015* (2013.01); *C01B 3/0021* (2013.01); *C01B 3/0068* (2013.01); *Y02E 60/328* (2013.01); *Y02E 60/325* (2013.01); *B01J 20/22* (2013.01); *B01J 20/18* (2013.01); *C01B 3/0031* (2013.01)
USPC .......... 423/648.1; 252/182.32; 48/61

(58) Field of Classification Search
USPC .............. 420/421, 900; 423/286, 644, 648.1; 252/182.32; 48/61
See application file for complete search history.

(56) References Cited

U.S. PATENT DOCUMENTS

| 4,110,425 A | 8/1978 | Buhl et al. |
|---|---|---|
| 4,249,654 A * | 2/1981 | Helversen ............ 206/0.7 |

(Continued)

FOREIGN PATENT DOCUMENTS

| WO | 2007130405 A2 | 11/2007 |
|---|---|---|
| WO | WO 2009075050 A1 * | 6/2009 |

OTHER PUBLICATIONS

"The hydrogen Pathway: Onboard storage of hydrogen" 2004-2005, No. 50/51 CLEFS CEA, p. 56-60.*

(Continued)

*Primary Examiner* — Wayne Langel
*Assistant Examiner* — Syed Iqbal
(74) *Attorney, Agent, or Firm* — Damian Porcari; Brooks Kushman P.C.

(57) ABSTRACT

According to one aspect of the present invention, a hybrid hydrogen storage system is provided. In one embodiment, the hybrid hydrogen storage system includes: a first hydrogen storage material present at a first volume percent (%) having a first gravimetric capacity and a first volumetric capacity; and a second hydrogen storage material forming an unreacted mixture with the first hydrogen storage material and present at a second volume % being 100 volume % minus the first volume %, the second storage material having a second gravimetric capacity and a second volumetric capacity, the first gravimetric capacity at the first volume % being higher or lower than the second gravimetric capacity at the second volume %, and the first volumetric capacity at the first volume % being the other of higher or lower than the second volumetric capacity at the second volume %.

20 Claims, 2 Drawing Sheets

(56) References Cited

U.S. PATENT DOCUMENTS

| | | | |
|---|---|---|---|
| 6,519,951 B2 | 2/2003 | Ovshinsky et al. | |
| 6,596,055 B2 | 7/2003 | Cooper et al. | |
| 6,814,782 B2 * | 11/2004 | Bogdanovic et al. | 95/116 |
| 6,969,545 B2 | 11/2005 | Finamore | |
| 7,666,388 B2 * | 2/2010 | Chen et al. | 423/658.2 |
| 2003/0103861 A1 * | 6/2003 | Stetson et al. | 420/417 |
| 2005/0166992 A1 | 8/2005 | Yokota et al. | |
| 2006/0264324 A1 * | 11/2006 | Schuth et al. | 502/400 |

OTHER PUBLICATIONS

Yang et al. "High capacity hydrogen storage materials: attributes for automotive applications and techniques for materials discovery" Chem. Soc. Rev., 20120, 39, 656-675.*

* cited by examiner

HYBRID HYDROGEN STORAGE SYSTEM AND METHOD USING THE SAME

BACKGROUND

1. Technical Field

One or more embodiments of the present invention relate to a hybrid hydrogen storage system and a method of using the same.

2. Background Art

Hydrogen is desirable as a secondary source of energy for many applications because its reaction with oxygen produces a clean by-product, i.e., water. Hydrogen has increasingly been considered as an environmentally clean energy carrier in the field of mobile or stationary applications.

However, use of hydrogen as an energy carrier has met with many implementation challenges. For example, efficient on-board storage and release of hydrogen is identified as one of the key practical obstacles to realizing a transition to hydrogen-powered vehicles.

SUMMARY

According to one aspect of the present invention, a hybrid hydrogen storage system is provided. In one embodiment, the hybrid hydrogen storage system includes: a first hydrogen storage material present in the hybrid hydrogen storage system at a first volume percent (%) under a storage condition, the first hydrogen storage material having a first gravimetric capacity and a first volumetric capacity based on the first volume % and the storage condition; and a second hydrogen storage material forming an unreacted mixture with the first hydrogen storage material and present in the hybrid storage system at a second volume % under the storage condition, the second volume % being 100 volume % minus the first volume %, and the second storage material having a second gravimetric capacity and a second volumetric capacity based on the second volume % and the storage condition, the first gravimetric capacity at the first volume % being higher or lower than the second gravimetric capacity at the second volume % at the storage condition, and the first volumetric capacity at the first volume % being the other of higher or lower than the second volumetric capacity at the second volume % at the storage condition.

In another embodiment, the first gravimetric capacity of the first hydrogen storage material is higher than the second gravimetric capacity of the second hydrogen storage material and the first volumetric capacity of the first hydrogen storage material is lower than the second volumetric capacity of the second hydrogen storage material. The first volume % of the first hydrogen storage material can be any suitable percentage from 0% to 100% and in certain instances is from 30% to 50% and in certain other instances, the first volume % of the first hydrogen storage material is from 70% to 90%.

In yet another embodiment, the hybrid hydrogen storage system is provided with a combined gravimetric capacity "Gc" in a range of 0.5 to 10.0 grams of hydrogen per 100 grams of the total weight of the hybrid hydrogen storage system, wherein the combined gravimetric capacity "Gc" is defined according to equation $Gc=m_{H2}/(m_{H2}+m_1+m_2+m_{Container})\times 100\%$, wherein $m_{H2}$ is the amount of hydrogen stored in the system, $m_1$ is the weight amount of the first hydrogen storage material, $m_2$ is the weight amount of the second hydrogen storage material, and $m_{Container}$ is the weight amount of the container itself without the first or second storage materials or the stored hydrogen.

In yet another embodiment, the first hydrogen storage material is a metal hydride. In certain other instances, the metal hydride is selected from the group consisting of Ti—Mn—Cr hydride, Ti—Cr—V hydride, $LaNi_5$ hydride, $NaAlH_4$, $NaBH_4$, and combinations thereof.

In yet another embodiment, the second hydrogen storage material is a sorbent. In certain instances, the sorbent is selected from the group consisting of activated carbons, carbon nanotubes, carbon aerogels, carbon xerogels, carbon nanofibers, metal organic frameworks (MOFs), zeolitic imidizolate frameworks (ZIFs), covalent organic frameworks (COFs), zeolites, and combinations thereof.

The metal hydride and the sorbent can be provided in any suitable volume ratio and in certain instances are provided in a volume ratio 20:80 to 80:20.

In yet another embodiment, the hybrid hydrogen storage system further includes a container to enclose the first and second hydrogen storage materials at a nominal storage pressure of no greater than 700 bar. In certain instances, the container is a Type II hydrogen compression tank.

According to yet another aspect of the present invention, a method is provided for storing hydrogen on-board a hydrogen-fueled vehicle at a storage condition. In one embodiment, the method includes providing a hybrid hydrogen storage system as described herein to the hydrogen-fueled vehicle, wherein the storage condition includes a storage temperature of greater than 123 degrees Kelvin and a nominal storage pressure of no greater than 700 bar. In another embodiment, the method further includes the use of a Type II tank as the storage tank.

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

Introduction and acceptance of hydrogen-fueled vehicles, such as those utilizing hydrogen fuel cells and/or hydrogen internal combustion engine, very much depend on a safe, efficient, and cost-effective system and method for storing hydrogen fuel on-board. To achieve wide-spread commercial viability across diverse vehicle platforms, it is desirable that hydrogen-fueled vehicles achieve certain performance attributes without significantly increasing weight or volume to the vehicle. Thus, the underlying technical goal for hydrogen storage is to develop a means to contain enough hydrogen fuel to support a conventional driving range (>300 miles) within the vehicular constraints of weight, volume, performance, efficiency, durability, and/or cost.

According to one or more embodiments of the present invention, the hydrogen storage system can be provided with certain hydrogen storage attributes meeting targeted guidelines. These targeted hydrogen storage attributes include volumetric capacity, gravimetric capacity, kinetics, operating pressure and/or temperature conditions. For instance, the hydrogen storage system described herein may be able to concurrently provide practically suitable gravimetric and volumetric capacities and coupled with, in certain particular instances, cost efficiency. At the same time, certain deficiencies inherent to each of the individual components such as low volumetric capacity for sorbents or low gravimetric capacity for metal hydrides can be minimized.

According to one or more embodiments of the present invention, two types of storage materials having substantially opposing strength and deficiencies that can be combined to synergize their strengths and minimize their deficiencies. These features present a departure from the art wherein one hydrogen storage attribute is often obtained at the cost of another. By way of example, and as referenced in the examples described herein, compressed hydrogen requires costly carbon-reinforced storage tanks for pressurized compression wherein an increase in gravimetric capacity comes with a relatively high materials cost. Conventional fuel cell vehicles using pressurized hydrogen compression have been met with limited use as they employ hydrogen for on-board use under high pressure, typically at 350 or 700 bar. These pressures are expensive both to provide and to maintain as they often require special attainment such as tanks using costly carbon fibers for structural reinforcement, wherein these carbon fiber reinforced tanks are generally orders of magnitude more expensive than an equivalent gasoline tank. On the other hand, while having relatively acceptable volumetric capacity, hydrogen containing compounds such as metal hydrides are relatively too heavy and therefore have generally unacceptable gravimetric capacity.

According to one aspect of the present invention, a hybrid hydrogen storage system is provided. In one embodiment, the hybrid hydrogen storage system includes: a first hydrogen storage material present in the hybrid hydrogen storage system at a first volume percent (%) under a storage condition, the first hydrogen storage material having a first gravimetric capacity and a first volumetric capacity based on the first volume % and the storage condition; and a second hydrogen storage material forming an unreacted mixture with the first hydrogen storage material and present in the hybrid storage system at a second volume % under the storage condition, the second volume % being 100 volume % minus the first volume %, and the second storage material having a second gravimetric capacity and a second volumetric capacity based on the second volume % and the storage condition, the first gravimetric capacity at the first volume % being higher or lower than the second gravimetric capacity at the second volume % at the storage condition, and the first volumetric capacity at the first volume % being the other of higher or lower than the second volumetric capacity at the second volume % at the storage condition.

In another embodiment, the first gravimetric capacity of the first hydrogen storage material is higher than the second gravimetric capacity of the second hydrogen storage material and the first volumetric capacity of the first hydrogen storage material is lower than the second volumetric capacity of the second hydrogen storage material. The first volume % of the first hydrogen storage material can be provided in any suitable percentage. In certain instances, the first volume % of the first hydrogen storage material is from 30% to 50%. In certain other instances, the first volume % of the first hydrogen storage material is from 70% to 90%.

According to another aspect of the present invention, a hydrogen storage system is provided for storing an amount of hydrogen "$m_{H2}$" by weight at a pressure "P" and at a temperature "T." In one embodiment, the hydrogen storage system includes a first hydrogen storage material having an amount "$m_1$" by weight and an amount "$v_1$" by volume, and a second hydrogen storage material having an amount "$m_2$" by weight and an amount "$v_2$" by volume, wherein the hydrogen storage system is provided with a combined gravimetric capacity "Gc" defined according to equation (i) and a combined volumetric capacity "Vc" defined according to equation (ii), $$Gc = \{m_{H2}/(m_{H2}+m_1+m_2 m_{Container})\} \times 100\% \quad \text{(i)}$$

$$Vc = \{m_{H2}/(v_1+v_2+v_{Container\,wall})\} \times 100\% \quad \text{(ii)}$$

wherein $m_{Container}$ is the total weight amount of the "empty" container without either the first or second hydrogen storage materials or the stored hydrogen, wherein the combined gravimetric capacity changes inversely with the combined volumetric capacity as the ratio of $m_1/m_2$ changes. It is appreciated that at the storage pressure "P", the sum of "$v_1$" and "$v_2$" and the weight of the container wall $v_{Container\,wall}$ equals the total external storage volume $v_{Container}$ of the container or that the combined volumetric capacity can be represented by $Vc = \{m_{H2}/v_{Container}\} \times 100\%$ In another embodiment, the combined gravimetric capacity is in a range of 0.5 to 10.0 grams of hydrogen per 100 grams of the total weight of the hydrogen storage system. In certain instances, the combined gravimetric capacity is in a range of 1.5 to 9.5, 2.5 to 9.0, 3.5 to 8.5, 4.5 to 8.0, or 5.5 to 7.5 grams hydrogen per 100 grams of the total weight of the hydrogen storage system.

In yet another embodiment, the combined volumetric capacity of the hydrogen storage system is in a range of 5 to 80 grams of hydrogen per liter of the total volume of the hydrogen storage system. In certain instances, the combined volumetric capacity is in a range of 15 to 70, 25 to 60, or 35 to 50 grams hydrogen per 100 grams of the total weight of the hydrogen storage system.

In another embodiment, the first hydrogen storage material is provided with a first gravimetric capacity and a first volumetric capacity, and wherein the second hydrogen storage is provided with a second gravimetric capacity greater than the first gravimetric capacity and a second volumetric capacity smaller than the first volumetric capacity. In this scenario, the first and second storage materials are provided to the hydrogen storage system with complementary features in relation to their respective gravimetric capacity and volumetric capacity, such that the hydrogen storage system can be provided with desirable combined gravimetric capacity and/or volumetric capacity by varying the chemical entity and the ratio of the first and second storage materials.

In one or more embodiments, the first and second hydrogen storage materials may be each independently selected from the group consisting of a) conventional metal hydrides such as hydrides of Ti—Mn—Cr, $LaNi_5$, b) complex hydrides such as $NaAlH_4$, $LiBH_4$, c) sorbent systems such as carbons, MOFs, with MOFs being particularly preferred in some instances, and d) chemical hydrides such as $NH_3BH_3$ and $NaBH_4$. These materials generally enable hydrogen to be packed even closer together than compressed or liquefied hydrogen. Without being limited by any particular theory, it is believed that hydrogen in these materials may be secured via interactions from physical binding or physisorption of molecular hydrogen through the relatively weak van der Waals forces to chemical binding or chemisorption of atomic hydrogen through the relatively strong valence forces.

As used herein in one or more embodiments, the term "conventional metal hydride" generally refers to a group of metal hydrides wherein hydrogen is relatively loosely deposited in the void spaces within the metal hydride structure. Therefore, hydrogen as present in the metal hydride is not substantially chemically bonded to the metal hydride.

As used herein in one or more embodiments, the term "complex metal hydride" generally refers to a group of metal hydrides wherein hydrogen is relatively securely deposited in the metal hydride structure. In certain instances, hydrogen as present in the metal hydride is chemically bonded to one or more atoms such as carbon in the metal hydride.

In yet another embodiment, the first hydrogen storage material is a metal hydride. The metal hydride includes saline hydrides, covalent hydrides such as hydrocarbons and other compounds that covalently bond to hydrogen atoms, and interstitial hydrides having metallic bonding to one or more hydrogen anions. The interstitial hydrides in turn can be based on inter-metallic compounds and solid-solution alloys. A non-limiting list of examples of the metal hydride includes Ti—Mn—Cr hydride, Ti—Cr—V hydride, $LaNi_5$ hydride, $NaAlH_4$, $NaBH_4$, $Ca(BH_4)_2$, $Mg(BH_4)_2$ and combinations thereof.

In yet another embodiment, the second hydrogen storage material is a sorbent. Sorbents can be referred to as porous lightweight materials that possess relatively high surface areas to which molecular hydrogen can physically adsorb, for instance via physisorption mechanism. For most sorbents, the amount of hydrogen adsorbed is typically proportional to a sorbent's surface area. Examples of the sorbents include carbon-based sorbents such as activated carbon, aerogels, and foam, and metal-based sorbents such as metal-organic frameworks (MOFs).

In one or embodiments, the hybrid material includes a metal hydride and a sorbent, having complementary properties, such that the hybrid material as a whole provides a synergistic performance that surpasses the metal hydride or the sorbent when performing alone. Without being limited to any theory, it is believed that sorbents possess favorable hydrogen capacity by weight whereas metal hydrides possess favorable hydrogen capacity by volume.

The metal hydride as the first hydrogen storage material and the sorbent as the second hydrogen storage material can be provided in any suitable volume ratio. In certain instances, the metal hydride as the first hydrogen storage material and the sorbent as the second hydrogen storage material are provided in a volume ratio of 20 to 80 percent. In yet another embodiment, the metal hydride as the first hydrogen storage material and the sorbent as the second hydrogen storage material are provided in a weight ratio of 2.5:97.5 to 60:40, 5:95 to 55:45, 7.5:92.5 to 50:50, or 10:90 to 45:55.

In yet another embodiment, the first and second storage materials are physically combined to form an admixture and are substantially unreacted toward each other. In this arrangement, it is appreciated that hydrogen absorption or desorption taking place in relation to one of the first and second storage materials does not necessarily depend upon the hydrogen absorption or desorption taking place in relation to the other of the first and second storage materials.

In yet another embodiment, the first and second storage materials are substantially unreacted to each other such that at least 85 percent by weight, 90 percent by weight, 95 percent by weight, or 99 percent by weight of the total hydrogen as present on and within the first hydrogen storage material in the form of atomic hydrogen, for instance $H^1$. In certain particular instances, the molecular hydrogen in the form of $H_2$ is not detectable as present on and within the first hydrogen storage material.

In yet another embodiment, the first and second storage materials are substantially unreacted to each other such that at least 85 percent by weight, 90 percent by weight, 95 percent by weight, or 99 percent by weight of the total hydrogen as present on and within the second hydrogen storage material in the form of molecular hydrogen, for instance $H_2$. In certain particular instances, the atomic hydrogen in the form of $H^+$ is not detectable as present on and within the first hydrogen storage material.

In yet another embodiment, the hydrogen storage system is configured to store hydrogen at a relatively less stringent temperature, for instance a non-cryogenic temperature that does not necessarily require a great amount of energy to form and/or to maintain, as compared to the conventional storage systems that uses cryogenic or para-cryogenic conditions wherein a temperature of more negative than 123 degrees Kelvin may be required. In certain instances, the temperature "T" at which the hydrogen storage system is to be maintained can be in a range of from 77 to 500 degrees Kelvin, or from 123 to 353 degrees Kelvin.

In yet another embodiment, the hydrogen storage system further includes a container to enclose the first and second hydrogen storage materials at the nominal pressure "P" of no greater than 700 bar. In certain particular instances, the container is a Type II hydrogen compression tank.

The Type II compression tank may be a container having a load-bearing metal liner with hoop wrapped fiber reinforcement. Type II compression tanks are relatively lighter than all-metal Type I tanks, but heavier than Type III and IV tanks. Type III and Type IV storage tanks have a non-load-bearing liner and full-wrapped fiber reinforcement. Type III tanks are provided with a metal inner liner for reducing or preventing hydrogen diffusion, whereas Type IV tank is provided with a plastic liner for reducing or preventing hydrogen diffusion. Any of the Type tanks may be used for cryogenic operations, provided that materials are compatible and a vacuum insulting layer must be additionally constructed around the tank structure. Adding in the vacuum insulating layer is itself a costly procedure.

It has been found, according to one or more embodiments of the present invention, improved robustness can be realized with the implementation of the hydrogen storage admixture for use in containers operable under relatively less stringent pressure and/or temperature. In one or more embodiments, the hydrogen storage admixture may be stored in a storage tank operable at a pressure of less than 700 bar, 600 bar, 500 bar, 400 bar, 300 bar, 200 bar. Moreover, the reduction in operating pressure also improves the potential robustness due to the associated stress levels. A relatively higher pressure system often requires additional stresses and failure modes, which could increase the system cost and design complexity to manage these robustness items including sealing, permeation, and metal embrittlement. For instance the tanks configured for operation at 200 bar or lower are significantly less cost relative to 700 bar tanks.

According to another aspect of the present invention, a method is provided for storing an amount of hydrogen "$m_{H2}$" by weight at a pressure "P" and at a temperature "T" for use on-board in a hydrogen fueled vehicle. In one embodiment, the method includes providing a hydrogen storage system to the hydrogen-fueled vehicle, wherein the hydrogen storage system includes a storage tank containing a hydrogen storage admixture as described herein. In another embodiment, the method further includes the step of depositing the hydrogen storage material admixture to a Type II tank as the container and the pressure "P" is kept at no greater than 200 bar. In yet another embodiment, the method further includes the step of selecting a ratio of m1/m2 based on the type of container to be used. In yet another embodiment, the method includes providing a metal hydride as the first hydrogen storage material and providing a sorbent as the second hydrogen storage material. The ratio of $m_1/m_2$ can be any suitable value and in certain instances is between 20/80 to 40/60.

In one or more embodiments, the method includes subjecting the hydrogen storage system to a first temperature wherein a first portion of hydrogen is released from the hydrogen storage admixture and subsequently subjecting the hydrogen storage system to a second temperature greater than the first temperature wherein a second portion of hydrogen is released from the hydrogen storage admixture. In certain instances, the first temperature is in a range of 70 to 300 degrees Kelvin. In certain other instances, the second temperature is in a range of 123 to 500 degrees Kelvin. By way of example, and according to the examples described herein, sorbents as one of the first and second storage materials may release hydrogen at a relatively low first temperature of from 77 degrees Kelvin to 123 degrees Kelvin. Once the hydrogen storage system gets warmed up and heated enough, metal hydrides as the other of the first and second storage materials may release another portion of hydrogen at a relatively warm temperature, for instance at the ambient temperature. As a result, hydrogen supply can be continued along a broadened temperature window to suit various operating conditions.

EXAMPLE

Example 1

Comparative

Table 1 summarizes several conventional pressurized compression storage systems in terms of gravimetric and volumetric capacity for storing 5 kilograms (kg) of hydrogen fuel.

TABLE 1

Comparison of conventional physical hydrogen storage systems for storing 5 kg of hydrogen fuel.

| Method Units | Gravimetric Capacity wt % · $H_2$ | Volumetric Capacity g · $H_2$/L | System Weight kg | System Volume L |
|---|---|---|---|---|
| 350 bar | 4.6 | 18 | 109 | 278 |
| 700 bar | 4.7 | 25 | 106 | 200 |
| Liquid $H_2$ | 4.4 | 33 | 114 | 152 |

Pressurized compression storage systems, even at exceedingly high pressures, their volumetric capacity is significantly low; for example 700 bar (10,000 psi) systems possess a volumetric capacity of just 25 g·$H_2$/L. This represents only one sixth the volumetric energy density of gasoline. Cryogenic storage of liquefied hydrogen provides slight improvements with respect to volumetric capacity. For example, and as shown in Table 1, liquid hydrogen systems exhibit volumetric density up to 33 g/L. Liquid hydrogen systems, however, require a significant energy input and fuel venting during dormancy, which in turn greatly reduces the practical 'useable' amount of hydrogen in the liquid hydrogen systems.

Example 2

Comparative

Table 2 provides the attributes of several selected material hydrogen storage system prototypes. These systems have all been normalized with respect to storage of 5 kg of hydrogen.

TABLE 2

Comparison of current materials hydrogen storage systems normalized to storage of 5 kg of total hydrogen stored.

| Method Units | Storage Condition | Gravimetric Capacity wt % · $H_2$ | Volumetric Capacity g · $H_2$/L | System Weight kg | System Volume L |
|---|---|---|---|---|---|
| NaAlH$_4$ (MH) | 388K 100 bar | 1.6 | 20 | 313 | 250 |
| Ti—Mn—Cr (MH) | RT 350 bar | 1.7 | 41 | 294 | 122 |
| AX-21 (sorbent) | 77K 20 bar | 4.5 | 28 | 111 | 179 |

For the first system shown in Table 2, the metal hydride NaAlH4 is provided as the only hydrogen storage material in a storage tank with a storage temperature of 388 degrees Kelvin and storage pressure of 100 bar. The first system has a gravimetric capacity of 1.6 weight percent of hydrogen, a volumetric capacity of 20 grams hydrogen per liter of the system volume. For this first system, hydrogen may be released by decreasing the system pressure while keeping the system temperature at 388 degrees Kelvin. For the second system shown in Table 2, the metal hydride Ti—Mn—Cr is the only hydrogen storage material in a storage tank, wherein the hydrogen storage temperature is at room temperature and the hydrogen storage pressure is at 350 bar. Without being limited to any particular theory, it is believed that conventional hydrides have many empty interstitial spaces for storing hydrogen relative to complex hydrides as the case in the first system of Table 2. As a result, the second system has a relatively greater volumetric capacity of 41 grams hydrogen per liter storage volume, as compared to the first system. However, this system comes with a disadvantage relative to the first system at least in that the second system adopts a more stringent requirement for its system's tolerance of high pressure. The third system shown in Table 2 uses sorbent AX-21 as the only hydrogen storage material in a storage tank. When compared to the first system, the sorbent alone system is provided with an increased gravimetric capacity of 4.5 weight percent hydrogen.

A non-limiting list of examples of the sorbent includes activated carbons, carbon nanotubes, carbon aerogels, carbon xerogels, carbon nanofibers, metal organic frameworks (MOFs), zeolitic imidizolate frameworks (ZIFs), covalent organic frameworks (COFs), zeolites, and combinations thereof.

Example 3

Hybrid Storage Systems

Three sample hybrid hydrogen storage systems, termed sample systems a, b, and c are devised based on data discussed herein above. In particular, these example systems are believed to have employed a synergistic combination of a sorbent and a metal hydride. These two classes of materials have complementary attributes, for instance, preferable gravimetric capacity for the sorbent and preferable volumetric capacity for the metal hydride. Specifications of the corresponding components of the sample systems are tabulated in Table 3.

TABLE 3 component specifications of sample systems a-c

| | | Sample System a | Sample System b | Sample System c |
|---|---|---|---|---|
| Container | Type | II | IV | II |
| | Base Weight in kg (kilograms) | 93 | 43 | 18 |
| | Operating Pressure in bar | 200 | 200 | 20 |
| | Operating Temperature in K (Kelvin) | 300 | 300 | 77 |
| Metal Hydride | Hydride Type | $AB_2$ | $AB_2$ | $AB_2$ |
| | Gravimetric Capacity in kg $H_2$/kg | 0.018 | 0.018 | 0.018 |
| | Bulk Density in kg/l | 4.8 | 4.8 | 4.8 |
| Sorbent | Gravimetric Capacity in kg $H_2$/kg | 0.07 | 0.07 | 0.08 |
| | Bulk Density in kg/l | 0.4 | 0.4 | 0.4 |

As shown in Table 3, the system "a" uses a type II tank which is to be operated under 200 bar at 300 K, for instance a tank with metal shell having a relatively less amount of fiber or more particularly composite fiber; the system "b" uses a type IV tank which is to be operated under 200 bar at 300 K, for instance a carbon fiber reinforced tank with plastic liner which therefore is relatively lighter in weight; and the system "c" uses a type II tank which is to be operated under 20 bar and at 77 K, for instance a tank with multi-layer vacuum insulation.

The metal hydride as employed in this example is an $AB_2$-type conventional metal hydrides, having the particular form Ti—Cr—Mn. This conventional metal hydride is cheaper in material cost as compared to BCC-type alloys such as Ti—Cr—V.

Sorbents typically require cryogenic conditions for instance at 77K in order to exhibit appreciable hydrogen uptake. By way of example, and as shown with sample system "c" at 20 bar and 77 K MOF-177 has a total adsorption of 8 wt %·$H_2$, a value not realizable with conventional systems wherein a MOF is best configured to carry out an uptake of up to 4 wt % at 300 K, yet the material remains unsaturated at this pressure. Materials densities have been estimated at 0.4 kg/L, given the known single crystal densities for MOFs generally range from 0.5 to 0.8 kg/L.

For each of the above three systems a-c, the data from Table 3 is used to estimate the attributes of a hybrid hydrogen storage system for storing 5 kg of total hydrogen. In particular metal hydride-to-sorbent volume percents are variable from 100% metal hydride to 100% sorbent using 10% increments. Using the above "empty" tank and materials attributes for each system, the total capacity for both gravimetric and volumetric, weight, and volume of the filled tank is projected. In particular, a combined gravimetric capacity data of each of the systems a-c is determined according to Equation (i) described herein above. Similarly, a combined volumetric capacity Vc can be defined according to Equation (ii) described herein above.

These combined volumetric and gravimetric capacity data are depicted below in FIGS. 1a (system a), 1b (system b), and 1c (system c). Each graph plots the volume % of metal hydride (MH) on the x-axis (i.e. 100%−x=volume % sorbent) and the y-axes are gravimetric capacity (left) and volumetric capacity (right). Gravimetric and volumetric capacity data points for the empty tanks are also provided. The following summarizes of the results for each system with the 30 volume % MH (i.e. 70 volume % sorbent) composition highlighted and compared. The 30 volume % MH point is specifically selected in order to make comparisons across all sample systems and because it generally represents a balanced tradeoff between volumetric and gravimetric capacity.

Figure 1A:
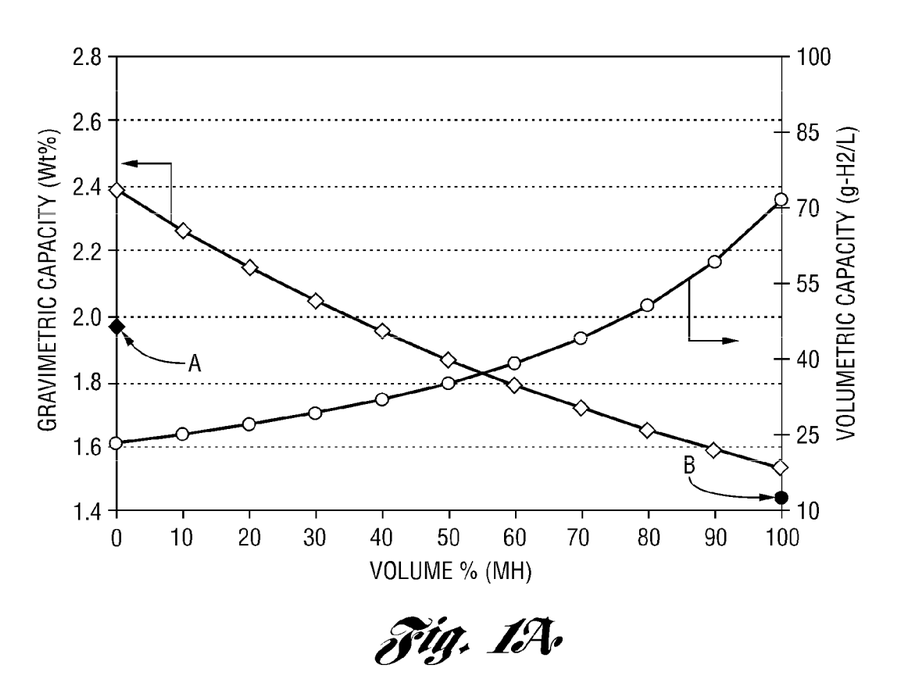
FIG. 1A depicts gravimetric capacity in primary y-axis and volumetric capacity in secondary y-axis as a function of metal hydride (MH) volume percent in a 200 bar, 300 K Type II tank according to one embodiment.
Figure 1B:
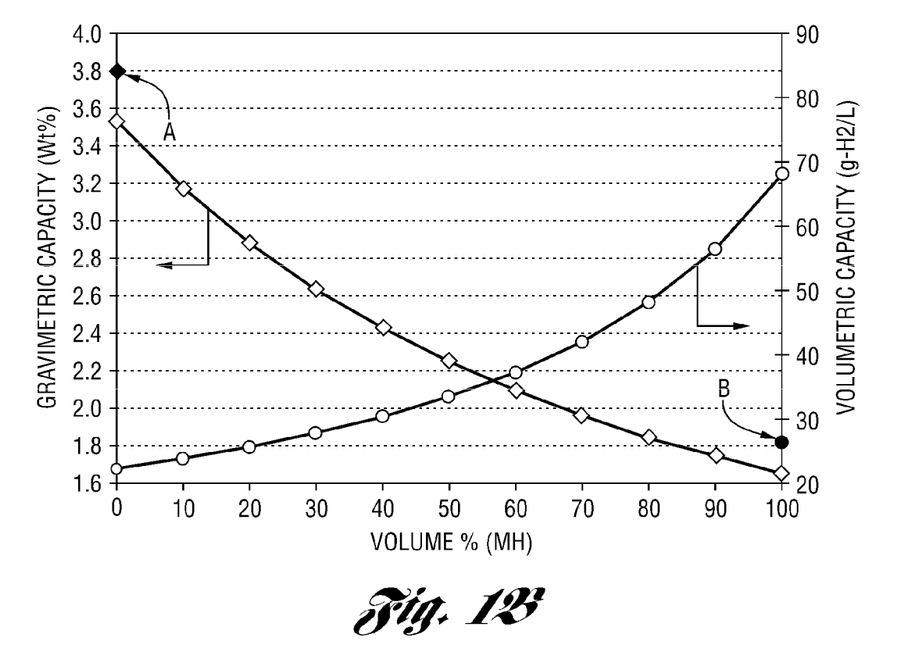
FIG. 1B depicts gravimetric capacity in primary y-axis and volumetric capacity in secondary y-axis as a function of metal hydride (MH) volume percent in a 200 bar, 300 K Type IV tank according to another embodiment.
Figure 1C:
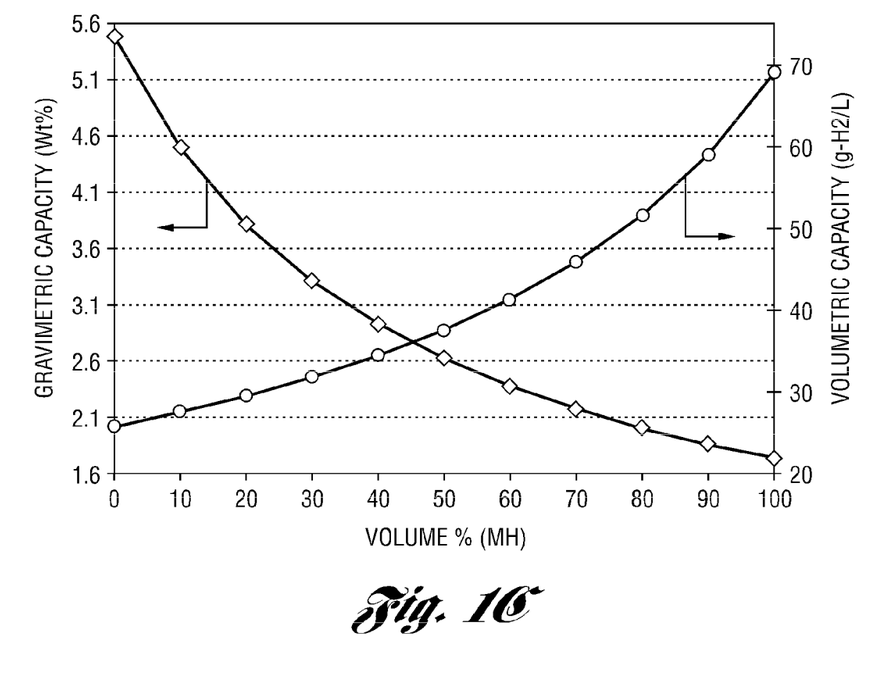
FIG. 1C depicts gravimetric capacity in primary y-axis and volumetric capacity in secondary y-axis as a function of metal hydride (MH) volume percent in a 20 bar, 77 K Type II tank according to yet another embodiment.

For sample system "a" using a Type II Tank at 200 bar and 300 K, and as depicted in FIG. 1A, a Type II 200 bar tank filled completely with sorbent, for instance 0 volume % MH referenced at point "A", the gravimetric and volumetric capacity is about 2.4 wt %·$H_2$ and about 23 g·$H_2$/L respectively. Conversely, if the same tank is filled completely with MH, for instance 100 volume % MH referenced at point "B", these values are about 1.5 wt %·$H_2$ and about 72 g·$H_2$/L. The 30 volume % MH (i.e. 70 volume % sorbent) is selected for discussion below and has a gravimetric and volumetric density of about 2.1 wt %·$H_2$ and 29 g·$H_2$/L respectively (243 kg and 171 L for overall system weight and volume). At this 30% MH level, the system is able to provide significantly (2.5×) greater volumetric density at comparable weight % to a compressed type II tank.

For sample system "b" using a Type IV Tank at 200 bar and 300 K, and as depicted in FIG. 1B, a Type IV 200 bar tank filled completely with sorbent, for instance 0 volume % MH as referenced at point "A", the gravimetric and volumetric capacity is about 3.5 wt %·$H_2$ and about 22 g·$H_2$/L respectively. Conversely, if the same tank is filled completely with MH, for instance 100 volume % MH as referenced at point "B", these values are about 1.7 wt %·$H_2$ and about 68 g·$H_2$/L. The 30 volume % MH (i.e. 70 volume % sorbent) is selected for discussion below and has a gravimetric and volumetric density of about 2.6 wt %·$H_2$ and 28 g·$H_2$/L respectively (190 kg and 181 L for overall system weight and volume).

For sample system "c" using a Type II Tank at 20 bar and 77 K, and as depicted in FIG. 1C, a Type II 20 bar tank operating at 77 K filled completely with sorbent, (i.e. 0 volume % MH), the gravimetric and volumetric capacity is about 5.5 wt %·$H_2$ and about 26 g·$H_2$/L respectively. Conversely, if the same tank is filled completely with MH (i.e. 100 volume % MH), these values are about 1.7 wt %·$H_2$ and about 69 g·$H_2$/L. The 30 volume % MH (i.e. 70 volume % sorbent) is selected for discussion below and has a gravimetric and volumetric density of about 3.3 wt %·$H_2$ and 32 g·$H_2$/L respectively (151 kg and 158 L for overall system weight and volume).

It has been found, and as shown in FIG. 1A-1C with sample systems "a" to "c", there are tradeoffs between the volumetric and gravimetric capacities. In particular, a combined gravimetric capacity of the hybrid hydrogen storage system can be increased by increasing the sorbent amount relative to the metal hydride amount. Conversely, a combined volumetric capacity of the hybrid hydrogen storage system can be increased by increasing the metal hydride amount relative to the sorbent amount. Based on the overall system weight and/or volume requirements and amount of hydrogen storage needed, the appropriate composition can be selected.

As shown herein, and according to one or more embodiments of the present invention, sorbents and conventional metal hydrides may be synergistically combined to form the hybrid hydrogen storage compositions such that carbon fiber in the storage container can either be reduced as with sample system b as with sample systems a and c. For example, the resulting gravimetric and volumetric densities of system c are competitive with conventional pressurized compression systems such as Type IV tanks at 350 or 700 bar using the very costly light-weight carbon fiber. In particular, the data point corresponding to 30 volume % MH and 70 volume % sorbent depicted in FIG. 1C corresponds to a gravimetric and volumetric density of about 3.3 wt %·$H_2$ and 32 g·$H_2$/L respectively, as compared to 4.8 wt %·$H_2$ and 25 g·$H_2$/L for conventional compression systems at 700 bar.

Figure 2:
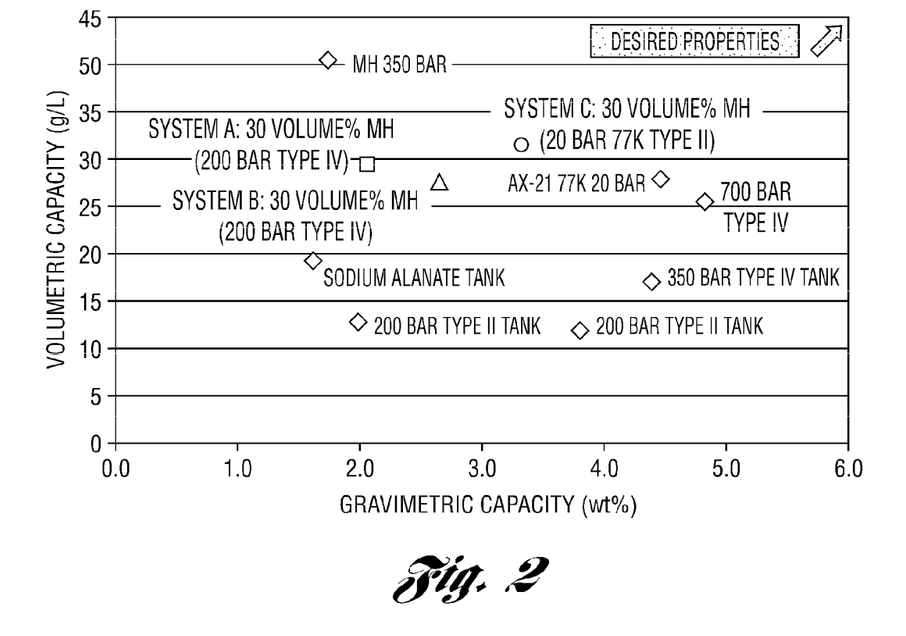
FIG. 2 depicts volumetric capacity in y-axis as a function of gravimetric capacity in x-axis compared among the three storage systems of FIGS. 1A-1C and conventional storage systems of Tables 1 and 2 discussed herein.

Overall volumetric and gravimetric capacities for example systems A, B, and C are plotted in FIG. 2 and compared with conventional compression based storage systems of Table 1 and materials based storage systems of Table 2.

While the best mode for carrying out the invention has been described in detail, those familiar with the art to which this invention relates will recognize various alternative designs and embodiments for practicing the invention as defined by the following claims.

What is claimed:

1. A hybrid hydrogen storage system comprising:
   a first hydrogen storage material present at a first volume percent (%) under a storage condition, and having a first gravimetric and volumetric capacity based on the first volume % and the storage condition;
   a second hydrogen storage material forming an unreacted mixture with the first hydrogen storage material and present at a second volume % under the storage condition, the second volume % being 100 volume % minus the first volume %, and the second storage material having a second gravimetric and volumetric capacity based on the second volume % and the storage condition, the first gravimetric capacity at the first volume % being higher than the second gravimetric capacity at the second volume % at the storage condition, the first volumetric capacity at the first volume % being lower than the second volumetric capacity at the second volume % at the storage condition;
   a first volume of hydrogen being stored in the first hydrogen material; and
   a second volume of hydrogen being stored in the second hydrogen material and being separate from the first volume of hydrogen,
   the first and second volumes of hydrogen being stored at a temperature of 77 to 353 degrees Kelvin.

2. The hybrid hydrogen storage system of claim 1, wherein the first volume % of the first hydrogen storage material is from 30% to 50%.

3. The hybrid hydrogen storage system of claim 1, wherein the first volume % of the first hydrogen storage material is from 70% to 90%.

4. The hybrid hydrogen storage system of claim 1, wherein the first hydrogen storage material is a metal hydride.

5. The hybrid hydrogen storage system of claim 4, wherein the metal hydride is selected from the group consisting of Ti—Mn—Cr hydride, LaNi$_5$ hydride, Ti—Cr—V hydride, NaAlH$_4$, NaBH$_4$, Mg(BH$_4$)$_2$, Ca(BH$_4$)$_2$, and combinations thereof.

6. The hybrid hydrogen storage system of claim 4, wherein the second hydrogen storage material is a sorbent.

7. The hybrid hydrogen storage system of claim 6, wherein the weight ratio of the metal hydride to the sorbent is 5:95 to 40:60.

8. The hybrid hydrogen storage system of claim 6, wherein the sorbent is selected from the group consisting of activated carbons, carbon nanotubes, carbon aerogels, carbon xerogels, carbon nanofibers, metal organic frameworks (MOFs), zeoliticimidizolate frameworks (ZIFs), covalent organic frameworks (COFs), zeolites, and combinations thereof.

9. The hybrid hydrogen storage system of claim 6, wherein the volume ratio of the metal hydride to the sorbent is 20:80 to 80:20.

10. The hybrid hydrogen storage system of claim 1, further comprising a container to enclose the first and second hydrogen storage materials.

11. The hybrid hydrogen storage system of claim 1, wherein the storage system has a combined gravimetric capacity "Gc", wherein the combined gravimetric capacity "Gc" is defined according to equation (i), $$Gc = mH_2/(mH_2 + m1 + m2 + mContainer) \times 100\% \quad (i)$$

Wherein mH2 is the amount of hydrogen stored in the system, m1 is the weight amount of the first hydrogen storage material, m2 is the weight amount of the second hydrogen storage material, and mContainer is the weight amount of the container.

12. The hybrid hydrogen storage system of claim 1, wherein the storage condition includes a storage temperature of greater than 123 degrees Kelvin and less than 353 degrees Kelvin, and a nominal storage pressure of no greater than 700 bar.

13. The hybrid hydrogen storage system of claim 10, wherein the container is a Type II hydrogen compression tank operable at a storage pressure of up to 250 bar.

14. A method comprising:
   storing a first volume of hydrogen in a first storage material and a second volume of hydrogen in the second storage material, the first volume of hydrogen being separate from the second volume of hydrogen, the first hydrogen storage material being present at a first volume percent (%) at a storage condition, the first hydrogen storage material having a first gravimetric and volumetric capacity based on the first volume % and the storage condition, the second hydrogen storage material forming an unreacted mixture with the first hydrogen storage material and being present at a second volume % at the storage condition, the second volume % being 100 volume % minus the first volume %, and the second storage material having a second gravimetric and volumetric capacity based on the second volume % and the storage condition, the first and second volume of hydrogen being present at a weight ratio of 0.5 to 10 grams per 100 grams of the first and second hydrogen storage materials, the first gravimetric capacity at the first volume % being higher or lower than the second gravimetric capacity at the second volume % at the storage condition, and the first volumetric capacity at the first volume % being respectively lower or higher than the second volumetric capacity at the second volume % at the storage condition; and releasing at least a portion of the first volume of hydrogen at a first temperature and at least a portion of the second volume of hydrogen at a second temperature different from the first temperature.

15. The method of claim 14, further comprising the step of depositing the hybrid hydrogen storage composition in a storage container.

16. The method of claim 15, further comprising the step of selecting a ratio of the first volume % and the second volume % based on the type of the storage container.

17. The method of claim 16, wherein the providing step includes providing a metal hydride as the first hydrogen storage material and providing a sorbent as the second hydrogen storage material.

18. A hydrogen storage system comprising:
a first hydrogen storage material present at a first volume percent (%) under a storage condition, and having a first gravimetric and volumetric capacity based on the first volume % and the storage condition, the first hydrogen storage material is a sorbent;
a second hydrogen storage material forming an unreacted mixture with the first hydrogen storage material and present at a second volume % under the storage condition, the second volume % being 100 volume % minus the first volume %, and the second storage material having a second gravimetric and volumetric capacity based on the second volume % and the storage condition, the first gravimetric capacity at the first volume % being lower than the second gravimetric capacity at the second volume % at the storage condition, the first volumetric capacity at the first volume % being higher than the second volumetric capacity at the second volume % at the storage condition, the second hydrogen storage material is a metal hydride;
a first volume of hydrogen being stored in the first hydrogen material; and
a second volume of hydrogen being stored in the second hydrogen material and being separate from the first volume of hydrogen,
the first and second volumes of hydrogen being stored at a temperature of 77 to 353 degrees Kelvin, and
the storage condition including a nominal storage pressure of no greater than 700 bar.

19. The hydrogen storage system of claim 18, wherein the first volume % of the first hydrogen storage material is from 30% to 50%.

20. The hydrogen storage system of claim 18, wherein the first volume % of the first hydrogen storage material is from 70% to 90%.

* * * * *